United States Patent
Saito

(10) Patent No.: US 7,324,644 B2
(45) Date of Patent: Jan. 29, 2008

(54) SCHEME FOR TRANSFERRING COPYRIGHT PROTECTED CONTENTS DATA USING RADIO LINK LAYER AUTHENTICATION/ENCRYPTION

(75) Inventor: Takeshi Saito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 925 days.

(21) Appl. No.: 09/934,674

(22) Filed: Aug. 23, 2001

(65) Prior Publication Data

US 2002/0025042 A1 Feb. 28, 2002

(30) Foreign Application Priority Data

Aug. 23, 2000 (JP) ............................. 2000-252882
Feb. 5, 2001 (JP) ............................. 2001-028544

(51) Int. Cl.
*H04L 9/00* (2006.01)

(52) U.S. Cl. .................. 380/200; 380/37; 380/270; 380/280; 713/161; 713/168; 713/170; 713/171; 726/27; 726/28; 726/29; 726/30

(58) Field of Classification Search ............... 705/51, 705/57; 380/37, 28, 46, 270, 200, 280; 713/193, 713/155, 161, 170, 171, 168; 726/4, 21, 726/31, 26; 725/27–30
See application file for complete search history.

(56) References Cited

U.S. PATENT DOCUMENTS

| 6,282,656 | B1 * | 8/2001 | Wang ............................. 726/4 |
| 6,418,421 | B1 * | 7/2002 | Hurtado et al. ................. 705/54 |
| 6,510,236 | B1 * | 1/2003 | Crane et al. ................. 382/116 |
| 6,587,680 | B1 * | 7/2003 | Ala-Laurila et al. ......... 455/411 |
| 6,611,812 | B2 * | 8/2003 | Hurtado et al. ................ 705/26 |
| 6,839,744 | B1 * | 1/2005 | Kloba et al. ................. 709/219 |
| 6,889,321 | B1 * | 5/2005 | Kung et al. .................. 713/153 |
| 2001/0042043 | A1 * | 11/2001 | Shear et al. .................. 705/51 |
| 2003/0093669 | A1 * | 5/2003 | Morais et al. ............... 713/163 |

FOREIGN PATENT DOCUMENTS

| EP | 0 915 590 | 5/1999 |
| JP | 2000-174797 | 6/2000 |

OTHER PUBLICATIONS

Bluetooth Specification, Version 1.0 B, vol. 1 (CORE), Part B, pp. 149-178, XP-002213095, "Bluetooth Security", Dec. 1, 1999.

(Continued)

*Primary Examiner*—Kambiz Zand
*Assistant Examiner*—Tongoc Tran
(74) *Attorney, Agent, or Firm*—Oblon, Spivak, McClelland, Maier & Neustadt, P.C.

(57) ABSTRACT

Between a transmitting device and a receiving device, a first authentication and key exchange procedure depending on a radio link layer network is carried out, and then a whole or a part of a second authentication and key exchange procedure depending on the copyright protected contents data is carried out by using the cipher communication using a first encryption key that is shared between the transmitting device and the receiving device by the first authentication and key exchange procedure, so that the contents data transfer by the cipher communication using a second encryption key can be carried out only between legitimate pair of the transmitting device and the receiving device that can successfully complete the first authentication.

24 Claims, 9 Drawing Sheets

OTHER PUBLICATIONS

DTCP, Revision 1.0 'Online', pp. 1-13, XP-002213172, "5C Digital Transmission Content Protection White Paper", Jul. 14, 1998.
J. Yoshida, et al., The Electronics Design, Technology & News Network, 'Online', Communications Design Conference, pp. 1-5, XP-002214265, "Hollywood Objections Threaten Content-Protection Scheme", Oct. 18, 1999.

U.S. Appl. No. 09/934,674, filed Aug. 23, 2001, Saito.
U.S. Appl. No. 10/729,964, filed Dec. 9, 2003, Isozaki et al.
U.S. Appl. No. 09/404,547, filed Sep. 24, 1999, pending.
U.S. Appl. No. 10/352,128, filed Jan. 28, 2003, Saito et al.

* cited by examiner

SCHEME FOR TRANSFERRING COPYRIGHT PROTECTED CONTENTS DATA USING RADIO LINK LAYER AUTHENTICATION/ENCRYPTION

BACKGROUND OF THE INVENTION

1. Field of the Invention

The present invention relates to a scheme for transferring data that require the copyright protection, through radio.

2. Description of the Related Art

In recent years, the digital network technology has been developing rapidly. There is no limit to the advance of the network technology such as portable telephone and Internet, and its applications are not limited to just the speech communications and becoming more diverse. The typical examples of such diverse applications include the music distribution on the Internet and the music distribution through a radio data network (i-mode, etc.) using portable telephones.

On the other hand, a new field called digital home electronics is also attracting much attention. This is a new home electronics technology utilizing the digital technology, and in particular, fields such as digital broadcasting and "digital AV home electronics" that utilizes the digital AV technology such as MD, DVD, etc. are expected to have considerable growth potential.

A field of "network home electronics" can be regarded as an amalgamation of these fields. In this field, the digital AV data (MPEG2 video, etc.) can be exchanged through networks such as IEEE 1394, and there is potential for newly creating many applications.

Under such circumstances, the problem of the copyright protection requires much consideration. The digital data have an advantageous feature in that they can be easily processed or stored without any degradation, but this feature in turn implies that they can be easily copied. Consequently, the digital data (such as those of movies or music, for example) that are intended to be purchased in exchange to some payment can be easily copied and acquired or transferred illegally.

For this reason, it is important to construct a mechanism for preventing the illegal act with respect to the copyright protected digital data.

A representative example of such a mechanism is DTCP (Digital Transmission Contents Protection) of the IEEE 1394. This mechanism prevents the eavesdropping by the third party by carrying out the authentication and key exchange procedure between a transmitting device and a receiving device of the AV data on the IEEE 1394 so as to share an encryption key for encrypting or decrypting the AV data, and transferring the AV data on the IEEE 1394 after encrypting the AV data by using this encryption key. This mechanism also incorporates a mechanism for preventing the illegal copy by an illegal receiving device by permitting the above described authentication and the key exchange (more specifically, the exchange of Certificate) only between those devices for which the safety is guaranteed in advance.

However, this mechanism presupposes the wired network such as IEEE 1394 or USB. In the case of the AV data transfer using the radio network, the AV data can be transferred between any devices (there is no need to connect devices through a cable so that it is possible to receive the AV data by simply commanding transmission via the radio), so that the third party can eavesdrop the AV data and the illegal act cannot be prevented.

BRIEF SUMMARY OF THE INVENTION

It is therefore an object of the present invention to provide a scheme for transferring copyright protected contents data which is capable of realizing the secure copyright protection even under the radio environment.

According to one aspect of the present invention there is provided a transmitting device for transmitting copyright protected contents data to a receiving device through radio communications, transmitting device comprising: a first authentication unit configured to carry out a first authentication with the receiving device, for judging whether the receiving device is a device that is allowed to communicate with the transmitting device or not, on a radio link layer of the radio communications; a first key exchange unit configured to generate a first encryption key and share the first encryption key with the receiving device when the first authentication with the receiving device by the first authentication unit is success; a second authentication unit configured to carry out a second authentication with the receiving device, for protecting copyright of the contents data to be transmitted, through an encrypted radio communication using the first encryption key; a second key exchange unit configured to generate a second encryption key and share the second encryption key with the receiving device when the second authentication with the receiving device by the second authentication unit is success; and a communication unit configured to transmit the contents data to the receiving device through an encrypted communication path which is encrypted by using the second encryption key and provided on the radio link layer.

According to another aspect of the present invention there is provided a transmitting device for transmitting copyright protected contents data to a receiving device through radio communications, transmitting device comprising: a first authentication unit configured to carry out a first authentication with the receiving device, for judging whether the receiving device is a device that is allowed to communicate with the transmitting device or not, on a radio link layer of the radio communications; a first key exchange unit configured to generate a first encryption key and share the first encryption key with the receiving device when the first authentication with the receiving device by the first authentication unit is success; a second authentication unit configured to carry out a second authentication with the receiving device, for protecting copyright of the contents data to be transmitted, through an encrypted radio communication using the first encryption key; a second key exchange unit configured to generate a second encryption key and share the second encryption key with the receiving device when the second authentication with the receiving device by the second authentication unit is success; and a communication unit configured to set up an encrypted communication path which is encrypted by using the second encryption key on the encrypted radio communication which is encrypted by using the first encryption key, and transmit the contents data to the receiving device through the encrypted communication path.

According to another aspect of the present invention there is provided a receiving device for receiving copyright protected contents data transmitted from a transmitting device through radio communications, the receiving device comprising: a first authentication unit configured to carry out a first authentication with the transmitting device, for enabling the receiving device to operate as a device that is allowed to communicate with the transmitting device, on a radio link layer of the radio communications; a first key exchange unit configured to generate a first encryption key and share the first encryption key with the transmitting device when the first authentication with the transmitting device by the first authentication unit is success; a second authentication unit configured to carry out a second authentication with the transmitting device, for protecting copyright of the contents data to be transmitted, through an encrypted radio communication using the first encryption key; a second key exchange unit configured to generate a second encryption key and share the second encryption key with the transmitting device when the second authentication with the transmitting device by the second authentication unit is success; and a communication unit configured to receive the contents data transmitted from the transmitting device through an encrypted communication path which is encrypted by using the second encryption key and provided on the radio link layer.

According to another aspect of the present invention there is provided a receiving device for receiving copyright protected contents data transmitted from a transmitting device through radio communications, the receiving device comprising: a first authentication unit configured to carry out a first authentication with the transmitting device, for enabling the receiving device to operate as a device that is allowed to communicate with the transmitting device, on a radio link layer of the radio communications; a first key exchange unit configured to generate a first encryption key and share the first encryption key with the transmitting device when the first authentication with the transmitting device by the first authentication unit is success; a second authentication unit configured to carry out a second authentication with the transmitting device, for protecting copyright of the contents data to be transmitted, through an encrypted radio communication using the first encryption key; a second key exchange unit configured to generate a second encryption key and share the second encryption key with the transmitting device when the second authentication with the transmitting device by the second authentication unit is success; and a communication unit configured to set up an encrypted communication path which is encrypted by using the second encryption key on the encrypted radio communication which is encrypted by using the first encryption key, and receive the contents data transmitted from the transmitting device through the encrypted communication path.

According to another aspect of the present invention there is provided a radio communication system, comprising a transmitting device for transmitting copyright protected contents data through radio communications, and a receiving device for receiving the contents data transmitted from the transmitting device, each one of the transmitting device and the receiving device having: a first authentication unit configured to carry out a first authentication between the transmitting device and the receiving device, for judging whether the transmitting device and the receiving device are devices that are allowed to communicate with the transmitting device or not, on a radio link layer of the radio communications; a first key exchange unit configured to generate a first encryption key and share the first encryption key between the transmitting device and the receiving device when the first authentication between the transmitting device and the receiving device by the first authentication unit is success; a second authentication unit configured to carry out a second authentication between the transmitting device and the receiving device, for protecting copyright of the contents data to be transmitted, through an encrypted radio communication using the first encryption key; a second key exchange unit configured to generate a second encryption key and share the second encryption key between the transmitting device and the receiving device when the second authentication between the transmitting device and the receiving device by the second authentication unit is success; and a communication unit configured to transfer the contents data from the transmitting device to the receiving device through an encrypted communication path which is encrypted by using the second encryption key and provided on the radio link layer.

According to another aspect of the present invention there is provided a radio communication system, comprising a transmitting device for transmitting copyright protected contents data through radio communications, and a receiving device for receiving the contents data transmitted from the transmitting device, each one of the transmitting device and the receiving device having: a first authentication unit configured to carry out a first authentication between the transmitting device and the receiving device, for judging whether the transmitting device and the receiving device are devices that are allowed to communicate with the transmitting device or not, on a radio link layer of the radio communications; a first key exchange unit configured to generate a first encryption key and share the first encryption key between the transmitting device and the receiving device when the first authentication between the transmitting device and the receiving device by the first authentication unit is success; a second authentication unit configured to carry out a second authentication between the transmitting device and the receiving device, for protecting copyright of the contents data to be transmitted, through an encrypted radio communication using the first encryption key; a second key exchange unit configured to generate a second encryption key and share the second encryption key between the transmitting device and the receiving device when the second authentication between the transmitting device and the receiving device by the second authentication unit is success; and a communication unit configured to set up an encrypted communication path which is encrypted by using the second encryption key on the encrypted radio communication which is encrypted by using the first encryption key, and transfer the contents data from the transmitting device to the receiving device through the encrypted communication path.

According to another aspect of the present invention there is provided a contents data transfer method in a radio communication system comprising a transmitting device for transmitting copyright protected contents data through radio communications and a receiving device for receiving the contents data transmitted from the transmitting device, the contents data transfer method comprising: carrying out a first authentication between the transmitting device and the receiving device, for judging whether the transmitting device and the receiving device are devices that are allowed to communicate with the transmitting device or not, on a radio link layer of the radio communications; generating a first encryption key and sharing the first encryption key between the transmitting device and the receiving device when the first authentication between the transmitting device and the receiving device is success; carrying out a second authentication between the transmitting device and the receiving device, for protecting copyright of the contents data to be transmitted, through an encrypted radio communication using the first encryption key; generating a second encryption key and sharing the second encryption key between the transmitting device and the receiving device when the second authentication between the transmitting device and the receiving device is success; and transferring the contents data from the transmitting device to the receiving device through an encrypted communication path which is encrypted by using the second encryption key and provided on the radio link layer.

According to another aspect of the present invention there is provided a contents data transfer method in a radio communication system comprising a transmitting device for transmitting copyright protected contents data through radio communications and a receiving device for receiving the contents data transmitted from the transmitting device, the contents data transfer method comprising: carrying out a first authentication between the transmitting device and the receiving device, for judging whether the transmitting device and the receiving device are devices that are allowed to communicate with the transmitting device or not, on a radio link layer of the radio communications; generating a first encryption key and sharing the first encryption key between the transmitting device and the receiving device when the first authentication between the transmitting device and the receiving device is success; carrying out a second authentication between the transmitting device and the receiving device, for protecting copyright of the contents data to be transmitted, through an encrypted radio communication using the first encryption key; generating a second encryption key and sharing the second encryption key between the transmitting device and the receiving device when the second authentication between the transmitting device and the receiving device is success; and setting up an encrypted communication path which is encrypted by using the second encryption key on the encrypted radio communication which is encrypted by using the first encryption key, and transferring the contents data from the transmitting device to the receiving device through the encrypted communication path.

Other features and advantages of the present invention will become apparent from the following description taken in conjunction with the accompanying drawings.

DETAILED DESCRIPTION OF THE INVENTION

Referring now to FIG. 1 to FIG. 6, the first embodiment of the present invention will be described in detail.

Figure 1:
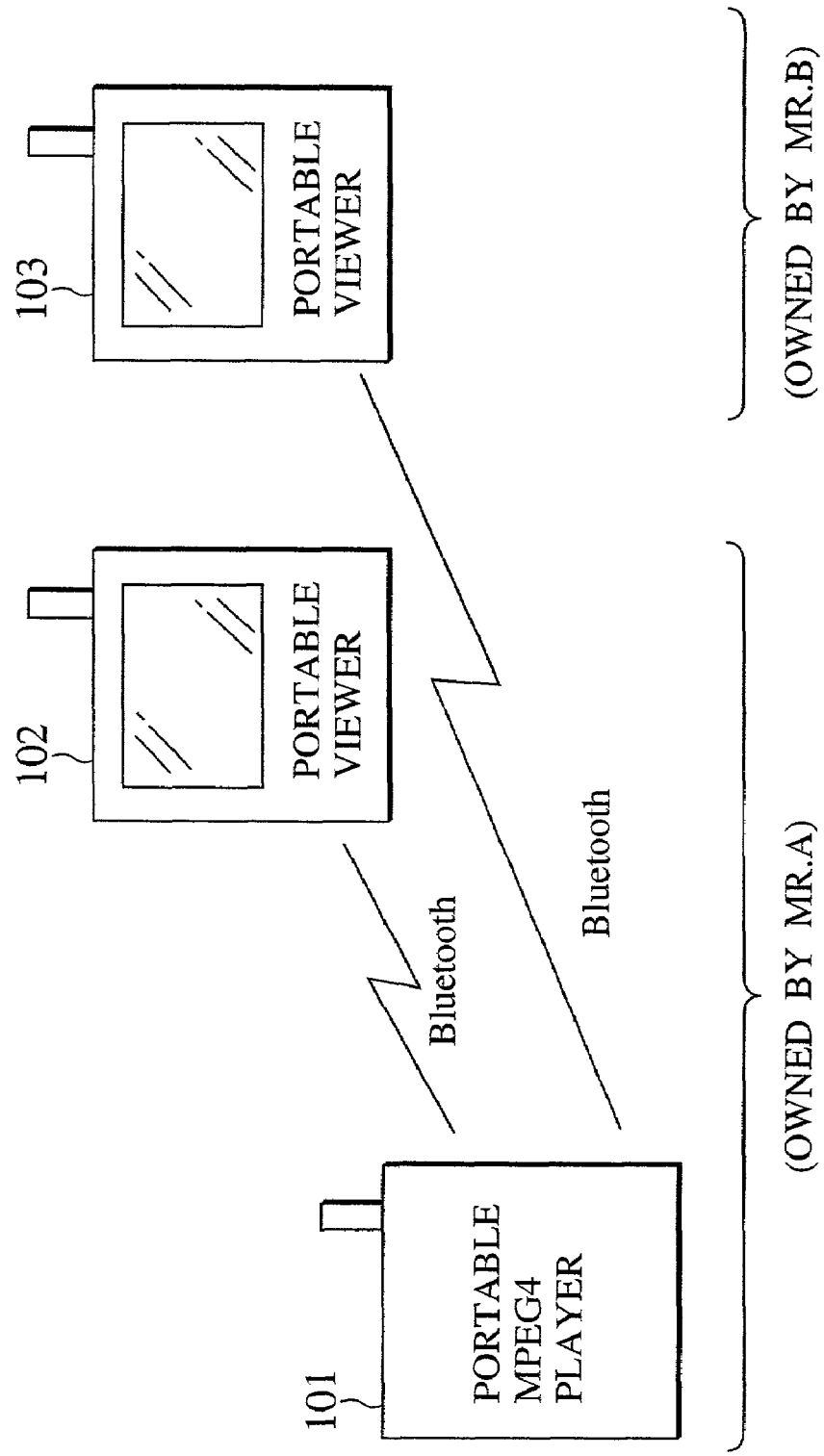
FIG. 1 is a schematic diagram showing an exemplary configuration of a radio communication system according to the first embodiment of the present invention.

FIG. 1 shows an exemplary configuration of a radio communication system according to the first embodiment. As shown in FIG. 1, a portable MPEG4 player 101 to be a source device and a portable viewer 102 to be a corresponding sink device are located within an area in which a connection by a local area radio network is possible (it is assumed that each one of the portable MPEG4 player 101 and the portable viewer 102 has a radio interface for this local area radio network).

Here, as shown in FIG. 1, suppose that a portable viewer 103 (which is assumed to have the same basic configuration as the portable viewer 102) is also located within an area in which a connection by the local area radio network is possible, besides the portable MPEG4 player 101 and the portable viewer 102.

Namely, these three portable terminals are existing in the same radio LAN (a single pico-net in the case of the Bluetooth), within an area in which the MPEG4 video can be transferred from the portable MPEG4 player to either portable viewer via the Bluetooth. Then, it is assumed that the portable MPEG4 player 101 and the portable viewer 102 are owned by the same person, say Mr. A, (they are intended to be used as a pair by Mr. A). whereas the portable viewer 103 is owned by a person other than Mr. A, say Mr. B (it is not intended to be used by Mr. A). Note that the portable viewer 103 will be considered for the sake of simplicity, but any other portable viewer owned by a person other than Mr. A that is existing in the connectable area can be treated similarly as the portable viewer 103.

Here, it is also assumed that the MPEG4 video (MPEG4 data) to be transferred should be transferred after applying the copyright protection.

Note also that the local area radio network is assumed to be the Bluetooth here. The Bluetooth is a kind of the radio LAIN characterized by its low cost and low power consumption, which is expected to be implemented in many portable terminals and home electronics.

In the following, the configuration for enabling the transfer of the MPEG4 video from the portable MPEG4 player 101 only with respect to the portable viewer 102 (such that the MPEG4 video can be playbacked only by the portable viewer 102) under the circumstance shown in FIG. 1 will be described.

Figure 2:
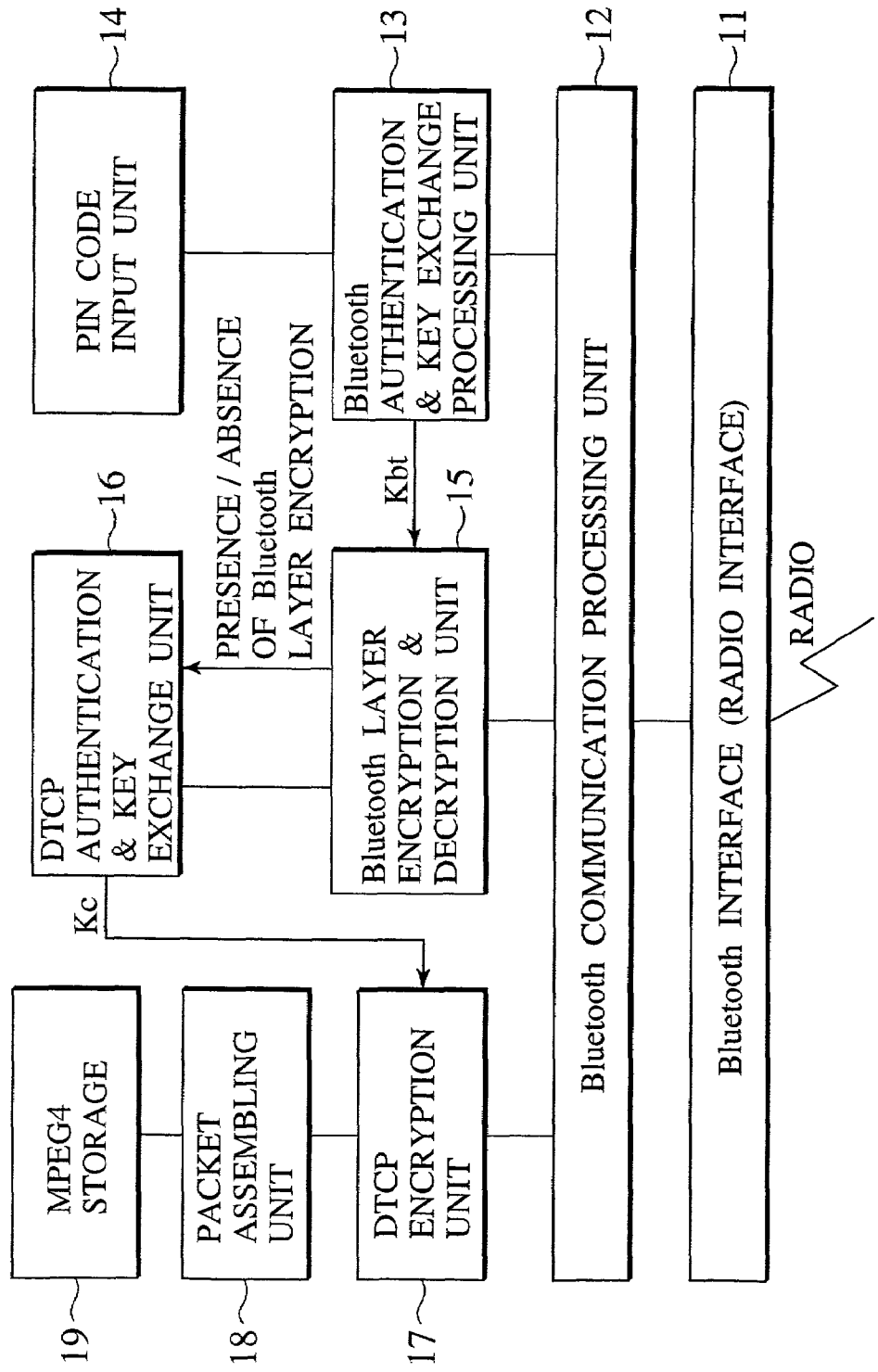
FIG. 2 is a block diagram showing an exemplary internal configuration of a portable PEG4 player in the radio communication system of FIG. 1.

FIG. 2 shows an exemplary internal configuration of the portable MPEG4 player 101. As shown in FIG. 2, the portable MPEG4 player 101 has a Bluetooth interface (radio interface) 11 for carrying out the physical layer processing of the Bluetooth, and a Bluetooth communication processing unit 12 for carrying out the datalink layer processing of the Bluetooth.

The specifications of the Bluetooth specify the authentication, key exchange and data encryption scheme called "Bluetooth Security". In other words, a scheme for the data encryption and the authentication and key exchange is already defined within the link layer scheme called Bluetooth. The portable MPEG4 player 101 has processing units for carrying out this processing, including a Bluetooth authentication and key exchange processing unit 13 for carrying out the Bluetooth authentication and key exchange procedure (data exchange), a PIN code input unit 14 for entering a PIN code, and a Bluetooth layer encryption and decryption unit 15 for carrying out the encryption of data to be transmitted and the decryption of received data. The authentication at the Bluetooth level is designed such that matching of a code called PIN code (which is given by a number in several digits or a password, or a body information such as fingerprint information, for example) on both sides is required for the success of the authentication.

Besides these, the portable MPEG4 player 101 has an MPEG4 storage 19 for storing MPEG4 AV data, and a packet assembling unit 18 for assembling Bluetooth packets from the MPEG4 AV data. The portable MPEG4 player 101 also has processing units on the copyright protection layer (application level) for transferring the MPEG4 data in encrypted form including a DTCP authentication and key exchange unit 16 for carrying out the DTCP authentication and key exchange procedure (data exchange) and a DTCP encryption unit 17 for encrypting data to be transmitted.

Here, DTCP stands for Digital Transmission Contents Protection, which is the de facto standard copyright protection scheme in the IEEE 1394, USB, etc. This scheme has a mechanism for carrying out the authentication and key exchange between the transmitting device and the receiving device, and transferring the AV data by encrypting them, with respect to the AV data that require the copyright protection (which can be identified as information indicating whether the copyright protection is required or not is attached to the AV data, for example).

Figure 3:
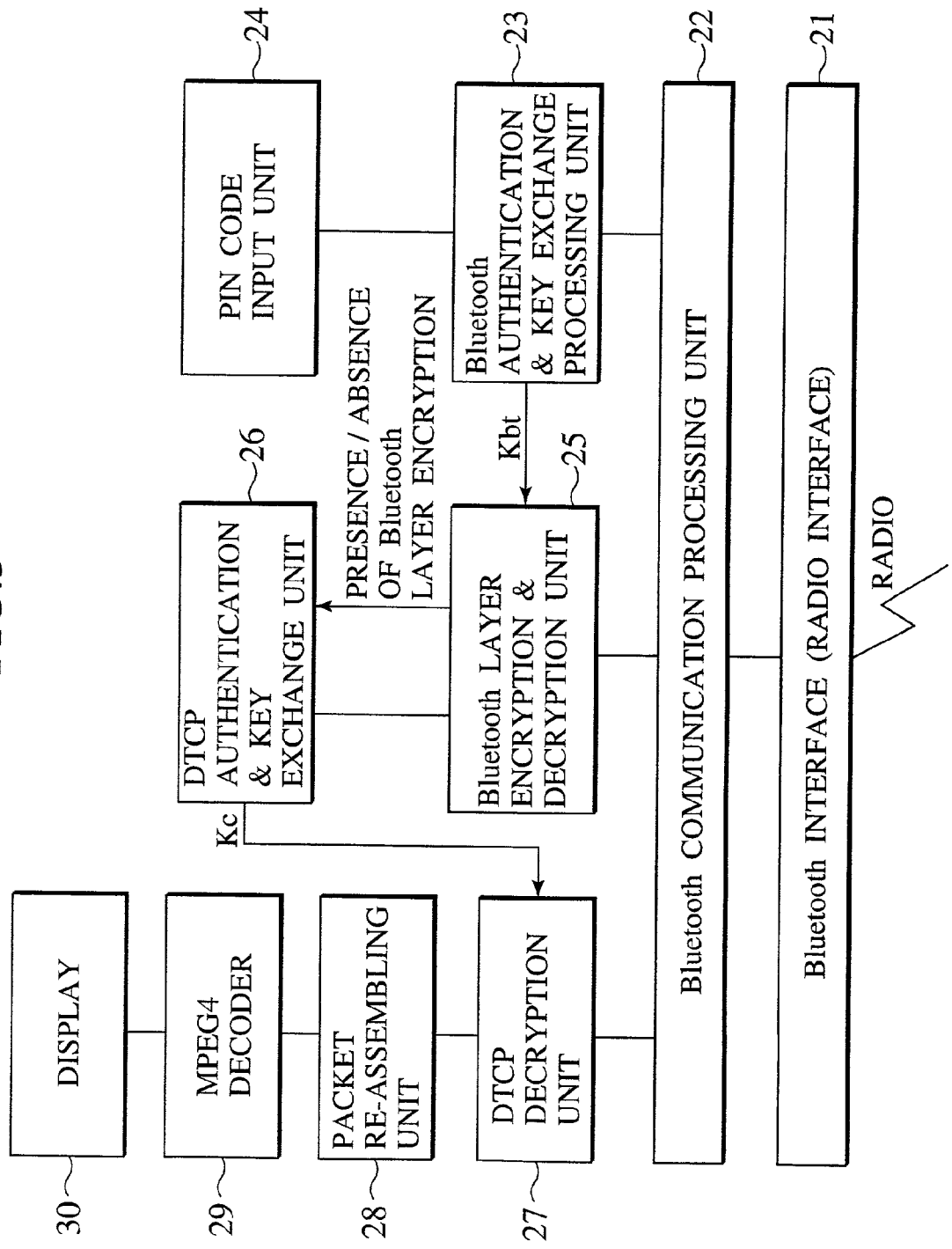
FIG. 3 is a block diagram showing an exemplary internal configuration of a portable viewer in the radio communication system of FIG. 1.

FIG. 3 shows an exemplary internal configuration of the portable viewer 102 (103). As shown in FIG. 3, the portable viewer 102 has a Bluetooth interface 21, a Bluetooth communication processing unit 22, processing units for carrying out the authentication and key exchange and the encryption at the Bluetooth level including a Bluetooth authentication and key exchange processing unit 23 for carrying out the Bluetooth authentication and key exchange procedure (data exchange), a PIN code input unit 24 for entering a PIN code, and a Bluetooth layer encryption and decryption unit 25 for carrying out the encryption of data to be transmitted and the decryption of received data, and processing units for carrying out the authentication and key exchange and the encryption of the AV data (on application level) including a DTCP authentication and key exchange unit 26 for carrying out the DTCP authentication and key exchange procedure (data exchange) and a DTCP encryption unit 27 for decrypting received data.

The portable viewer 102 also has a packet re-assembling unit 28 for re-assembling the MPEG4 data from the Bluetooth packets, an MPEG4 decoder 29 for decoding the MPEG4 data, and a display 30 for displaying the decoded MPEG4 data.

Figure 4:
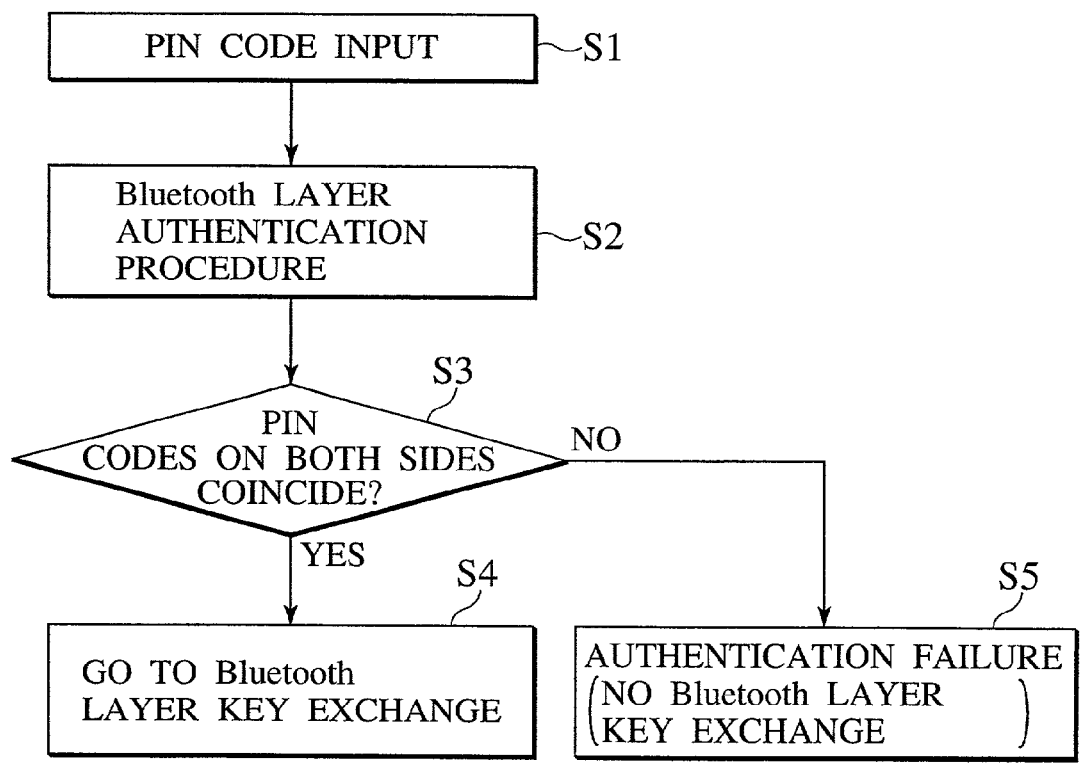
FIG. 4 is a flow chart showing an outline of a Bluetooth layer authentication procedure in the radio communication system of FIG. 1.

FIG. 4 shows an outline of the authentication procedure on the Bluetooth layer.

First, at each device (the portable MPEG4 player, the portable viewer), the PIN code is entered (step S1). Note that the PIN code can be newly entered at each occasion or can be entered and set up in advance.

Then, the both devices carry out the authentication procedure on the Bluetooth layer (using the Bluetooth authentication and key exchange processing units 13 and 23) (step S2).

The PIN codes are exchanged between the both devices and if the authentication is success as these PIN codes coincide (step S3 YES), the key exchange procedure on the Bluetooth layer is carried out and the key sharing is realized successfully (step S4).

After that, by using the Bluetooth layer key that is shared (by the Bluetooth layer encryption and decryption units 15 and 25), the DTCP authentication and key exchange (by the DTCP authentication and key exchange units 16 and 26) can be carried out safely. As a result, the DTCP key is shared and the cipher communication of the MPEG4 data becomes possible (it becomes possible to encrypt data at the DTCP encryption unit 17 and decrypt data at the DTCP decryption unit 27).

On the other hand, when the authentication is failure as the PIN codes do not coincide (step S3 NO), the key exchange procedure on the Bluetooth layer is carried out but the key sharing is unsuccessful (step S5).

In this case, the Bluetooth layer key will not be shared so that even when the DTCP authentication and key exchange (by the DTCP authentication and key exchange units 16 and 26) is carried out, the DTCP authentication and key exchange will be unsuccessful (the DTCP key cannot be shared), because the decryption by using an incorrect Bluetooth layer key will be carried out. In addition, if the DTCP authentication and key exchange is unsuccessful, even when the MPEG4 data that are encrypted (by using the DTCP key at the DTCP encryption unit 17) are received, the received MPEG4 data cannot be decrypted because a correct DTCP key is not known at the DTCP decryption unit 27.

Note that it is also possible to adopt a procedure in which the key exchange procedure on the Bluetooth layer itself is not to be carried out in the case where the authentication fails as the PIN codes of the both devices do not coincide.

Note also that the authentication is considered as success when the PIN codes of the both devices coincide in this embodiment, but alternatively, it is also possible to adopt a scheme in which the authentication is considered as success when the PIN code value of one side and the PIN code value of the other side are in a prescribed relationship (such as a relationship in which a part of the address information is utilized as the user attribute information, for example). Note here that a relationship in which the PIN code values of the both devices coincide can also be regarded as a kind of prescribed relationship.

Here, the variations of the PIN codes will be described.

First, there are several variations in the method for entering or setting up the PIN code, including (1) a method in which the user enters the PIN code at each occasion, (2) a method in which the user sets up the PIN code in advance, (3) a method in which the manufacturer or the retailer sets up the PIN code in advance (in a form that cannot be changed by the user), and (4) a method for using all or a part of the above (1) to (3) in combination (such as a method for concatenating a code of (1) and a code of (3)), for example. There is also a method in which the user is allowed to select one of the above (1) and (2) appropriately, for example.

There are also several variations in the content of the PIN code.

In the case of the above (1) or (2), there is a method in which the user determines the PIN code at each occasion. There is also a method in which a password is generated randomly at one device (the portable MPEG4 player, for example) and this password is stored in that one device side as the PIN code and presented to the user, and the user who read this password enters the same password into the other device (the portable viewer, for example). There is also a method for using the fingerprint information, the voiceprint information, or the cornea information (in which case there is a need for a device for acquiring such information which can be either provided in the portable MPEG4 player or the portable viewer, or which can be externally connectable to the portable MPEG4 player or the portable viewer).

Also, in the case of the above (2), there is a method in which the user attribute information is registered in the portable MPEG4 player or the portable viewer and the PIN code is generated according to this information (such as user name, address, age, school name, occupation, company name, section name, names of family members, for example). However, an information from which the PIN code is to be generated must have a value that can make the PIN codes on the both devices identical, such as an identical value, for example.

Also, in the case of the above (3), there is a method in which the manufacturer or the retailer sets up the identical random number in one set of the portable MPEG4 player and the portable viewer at a time of manufacturing or selling. There is also a method in which the retailer acquires the user's fingerprint information or the like at a time of selling and sets it up in one set of the portable MPEG4 player and the portable viewer.

Now, the portable MPEG4 player and the portable viewer of this embodiment are realizing the situation in which "the AV data transfer applications will be operated properly between player and viewer that are legitimate pair" and "the AV data transfer applications will not be operated properly between player and viewer that are not legitimate pair (the AV data cannot be reproduced properly on the viewer)". For example, when the portable MPEG4 player and the portable viewer owned by the same person are the legitimate pair, it is possible to realize the environment in which data from the portable MPEG4 player owned by himself can be reproduced by the portable viewer owned by himself, but data from the portable MPEG4 player owned by himself cannot be reproduced by the portable viewer owned by someone else, and data from the portable MPEG4 player owned by someone else cannot be reproduced by the portable viewer owned by himself.

In other words, in the case of using radio as interface in general, the radio signals outputted from the player are naturally put in a state where they can be received by any viewer within a certain range, so that from a viewpoint of the viewer side, this implies that each portable viewer is allowed to access (command transmission of) data regardless of whether it is a portable viewer of the legitimate pair or not. Here, on the copyright protection layer, if the both devices (a transmitting side device and a receiving side device) are DTCP compliant (DTCP based) devices, the authentication and key exchange can be successfully done in either case. In other words, on the copyright protection layer whether a correspondent device is a device of the legitimate pair or not cannot be distinguished. For this reason, in this embodiment, the Bluetooth level authentication is utilized for the purpose of distinguishing whether a correspondent device is a device of the legitimate pair or not.

Namely, when the authentication and key exchange at the Bluetooth level is successful, it is judged that this implies a correspondent device is a device of the legitimate pair, and a transition to the authentication and key exchange at the application level (the DTCP level) is made. When the authentication and key exchange at the Bluetooth level is unsuccessful, it is judged that this implies a correspondent device is not a device of the legitimate pair, and a transition to the authentication and key exchange at the application level (the DTCP level) is refused.

This is because when the authentication and key exchange at the Bluetooth level is successful, it can be ascertained that the both devices (a transmitting device and a receiving device) are the devices of the legitimate pair. Namely, the authentication at the Bluetooth level is an authentication procedure using the PIN code values, which succeeds when "the same PIN code (a number in several digits or password, or fingerprint information, etc., for example) can be entered into the both devices (a transmitting device and a receiving device)" or "the same PIN code is set up in the both devices (a transmitting device and a receiving device)", so that the success of the authentication at the Bluetooth level can be considered as sufficient for conjecturing or recognizing that the both devices are the legitimate pair (a probability in which the PIN codes entered into devices which are not the legitimate pair to coincide by accident is sufficiently small).

For example, in the case where the portable MPEG4 player and the portable viewer owned by the same person are to be regarded as the legitimate pair, Mr. A can enter the same PIN code (password) into his own portable MPEG4 player and portable viewer, but it is extremely difficult for Mr. B to guess and enter this same PIN code (password) into his own portable viewer, so that it is possible to judge that the portable MPEG4 player and the portable viewer are the legitimate pair owned by the same person if the entered PIN codes are identical, and that they are illegitimate pair owned by different persons if the entered PIN codes are different. Also, in the case of using the fingerprint information or the like for the PIN code, it is impossible for Mr. B to enter the same PIN code (fingerprint information or the like) as that of Mr. A into his own portable viewer unless Mr. B has stolen the fingerprint information or the like of Mr. A.

Here, the exemplary case of exchanges between the portable MPEG4 player 101 and the portable viewer 102 and exchanges between the portable MPEG4 player 101 and the portable viewer 103 will be described.

Figure 5:
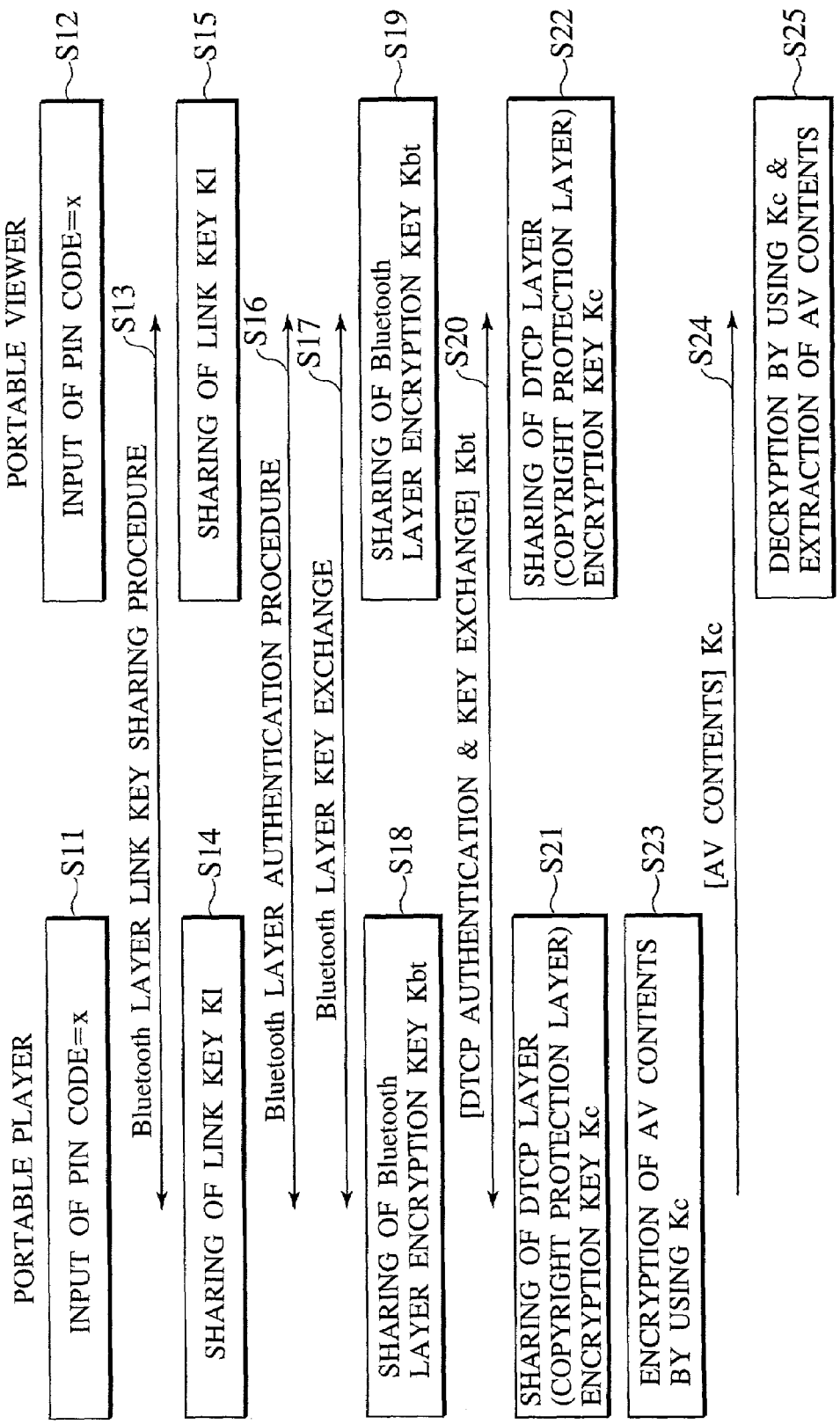
FIG. 5 is a sequence chart showing an exemplary operation sequence between a portable MPEG4 player and a portable viewer which are a legitimate pair in the radio communication system of FIG. 1.

FIG. 5 shows an exemplary sequence to be carried out between the portable MPEG4 player 101 and the portable viewer 102 of Mr. A which are the legitimate pair. Note that, in FIG. 5, aspects related to the encryption and decryption at the link layer are omitted as they are obvious.

In this case, first, the PIN code is entered by a prescribed method at a prescribed timing (in advance or before the actual use, for example) into both the portable MPEG4 player 101 and the portable viewer 102 (steps S11 and S12). Here, the value of the PIN code entered at the portable MPEG4 player 101 side is assumed to be "x", and it is assumed that the same value "x" is also entered as the PIN code value at the portable viewer 102 side. As the PIN code values on both devices coincide, it is possible in this case to complete the subsequent Bluetooth layer authentication procedure successfully.

Then, the Bluetooth layer link key sharing procedure is carried out (step S13), and a value of the link key Kl to be used in the subsequent authentication and key exchange is shared (steps S14 and S15).

Then, the Bluetooth layer authentication procedure is carried out (step S16). In this case, the same PIN code is shared so that the authentication is success.

Then, the Bluetooth layer key exchange procedure is carried out (step S17), and a value of the Bluetooth layer encryption key Kbt is shared (steps S18 and S19).

As a result, it becomes possible to carry out the exchange of any data in the encrypted form (such that the others cannot eavesdrop or rewrite the data) on the Bluetooth layer between the both devices.

Next, the portable MPEG4 player 101 and the portable viewer 102 move on to the DTCP (copyright protection layer) authentication and key exchange phase. Here, it is preferable for the both devices to carry out a whole or a part of the DTCP authentication and key exchange procedure by applying the encryption at the Bluetooth level. In this way, it becomes possible to guarantee that the DTCP authentication and key exchange is carried out (completed) only between devices of the legitimate pair (which have successfully completed the Bluetooth level authentication and key exchange), so that it becomes possible to successfully complete the copyright protection layer (DTCP) level authentication and key exchange only between devices of the legitimate pair (which are owned by the same person, for example), and it becomes possible to share the copyright protection layer (DTCP) level encryption key only between devices of the legitimate pair (which are owned by the same person, for example).

Next, the portable MPEG4 player 101 and the portable viewer 102 carry out the DTCP authentication and key exchange by utilizing the Bluetooth layer level encryption (step S20), and the sharing of the encryption key Kc on the DTCP layer (copyright protection layer) between the both devices is realized (steps S21 and S22).

After that, the portable MPEG4 player 101 that is a transmitting side device transmits the AV contents (MPEG4 data) to be transmitted by encrypting them by using the encryption key Kc, to the portable viewer 102 which is a receiving side device (step S24). The portable viewer 102 can decrypt these encrypted contents and extracts the MPEG4 data because the DTCP level encryption key Kc is already shared. Namely, the portable viewer 102 decrypts the received encrypted contents by using the DTCP level encryption key Kc (step S25) and displays them on a display.

In contrast, any other receiving device located in the same Bluetooth pico-net does not share the encryption key Kc because the DTCP level authentication and key exchange has not been carried out, and therefore it cannot reproduce the data as will be described below.

Figure 6:
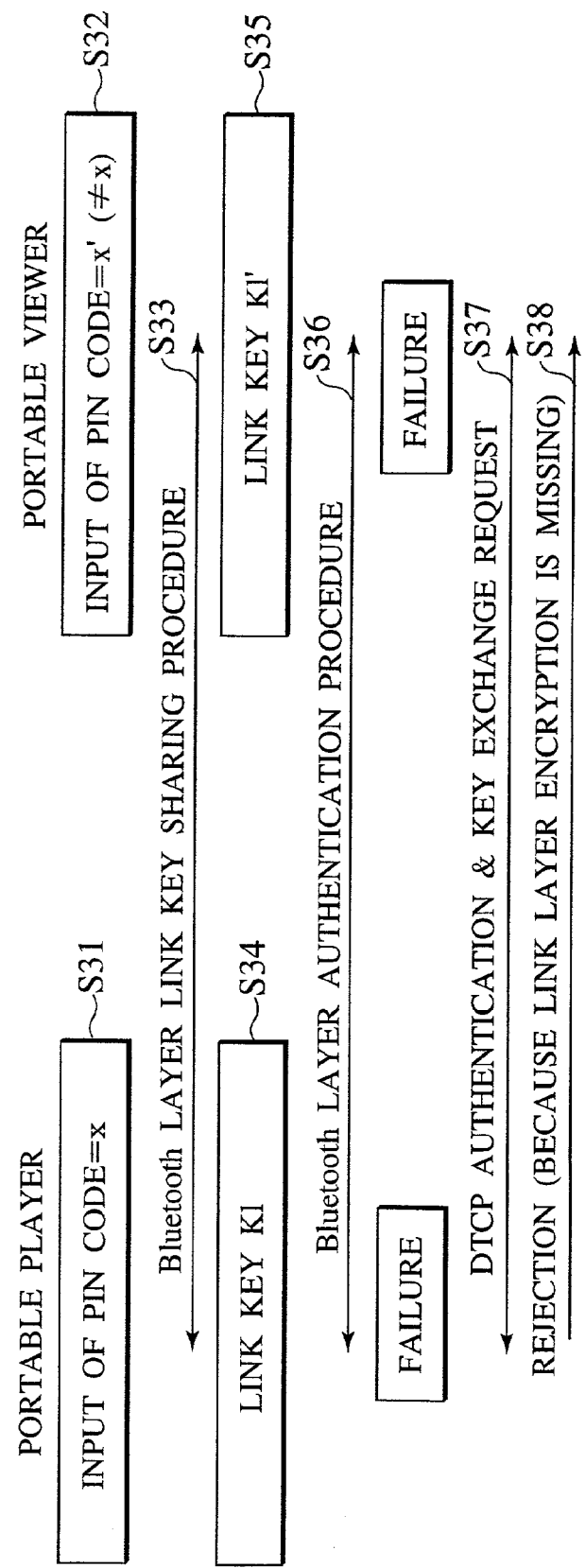
FIG. 6 is a sequence chart showing an exemplary operation sequence between a portable MPEG4 player and a portable viewer which are not a legitimate pair in the radio communication system of FIG. 1.

FIG. 6 shows an exemplary sequence to be carried out between the portable MPEG4 player 101 of Mr. A and the portable viewer 103 of Mr. B which are not the legitimate pair.

First, the respective PIN codes are entered by a prescribed method at a prescribed timing (in advance or before the actual use, for example) into the portable MPEG4 player 101 and the portable viewer 103 (steps S31 and S32).

However, in this case, if the value of the PIN code entered at the portable MPEG4 player 101 side is assumed to be "x" as described above, a probability for a value "x" of the PIN code entered at the portable viewer 103 side to coincide with the value "x" is none or extremely low. Namely, in the case where the user enters the PIN code manually, for example, it is highly unlikely to have the same PIN code entered into the both devices because these devices are devices owned by different persons. Also, in the case of registering the unique PIN code into devices of the legitimate pair in advance, the PIN codes of these devices will not coincide because the portable MPEG4 player 101 of Mr. A and the portable viewer 103 of Mr. B are assumed to be not the legitimate pair in this example.

Thus, even when the Bluetooth layer link key sharing procedure is carried out (step S33) in an attempt to share the link key value to be used in the subsequent authentication and key exchange (steps S34 and S35), the link key Kl on the portable MPEG4 player 101 side and the link key Kl' on the portable viewer 103 side that are generated according to the respective PIN codes do not coincide because the PIN codes do not coincide, and therefore the sharing of the link key will fail.

Consequently, even when the subsequent Bluetooth layer authentication procedure is carried out (step S36), this will also fail. As a result, the subsequent Bluetooth layer key exchange procedure will not be carried out.

Then, as the Bluetooth encryption cannot be realized, it is impossible to move on to the DTCP authentication and key exchange procedure, and therefore the DTCP authentication and key exchange cannot be completed successfully. Namely, even when the DTCP authentication and key exchange request comes from the receiving side portable viewer 103 (step S37), if it has been sent in a form without the Bluetooth level encryption, this request will be rejected (step S38). As a result, the copyright protection level authentication and key exchange fails and therefore the copyright protected AV data cannot be transferred between devices which are not the legitimate pair (which are owned by different persons, for example).

Note that, at a time of notifying the rejection message to the correspondent at the step S38, the reason for the rejection (because the encryption at the link layer, i.e., the Bluetooth layer is missing, or because the Bluetooth layer authentication has not been carried out) may be notified as well. Such a notification can urge the correspondent to carry out the Bluetooth layer authentication and key exchange if the correspondent is a legitimate one (owned by the same person, for example).

Note that, in the above, it is assumed that the MPEG4 data are stored in the portable MPEG4 player, but it is also possible to acquire the MPEG4 data from the external, or store the source data before the encoding and generate the MPEG4 data by an MPEG4 encoder provided therein, or acquire the source data from the external and generate the MPEG4 data therein. It is also possible to apply the present invention to exchange of data other than the MPEG4 video (MPEG4 data).

Note also that, in the above, it is assumed that there are one transmitting side device and one receiving side device, but it is also possible to apply the present invention to the data transfer from one transmitting device to a plurality of receiving devices. In this case, in the sequence of FIG. 5 for example, the procedure up to the sharing of the encryption key Kc can be carried out between the portable MPEG4 player and each portable viewer separately, such that the encryption key Kc is shared by all the devices which have successfully completed the authentication and key exchange. As a result, when the portable MPEG4 player transmits the AV contents by encrypting them by using the encryption key Kc, the legitimate portable viewers which have successfully shared the encryption key Kc can decrypt the encrypted contents and display them. Note that, in this case, it is also possible to set up an upper limit for the number of receiving devices to which the data can be transferred from the transmitting device simultaneously, separately for each transmitting device or for each content.

Figure 7:
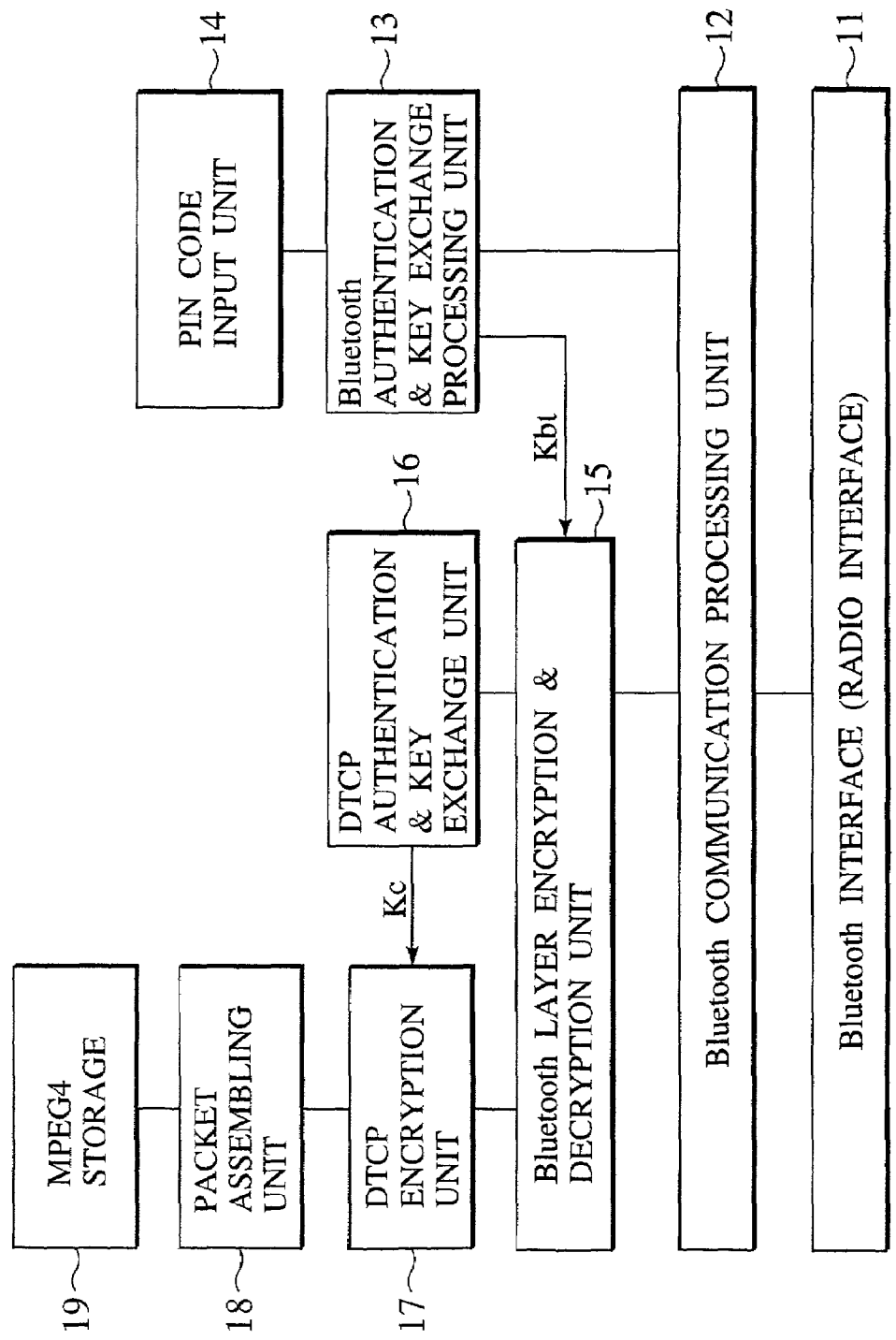
FIG. 7 is a block diagram showing an exemplary internal configuration of a portable PEG4 player in a radio communication system according to the second embodiment of the present invention.
Figure 8:
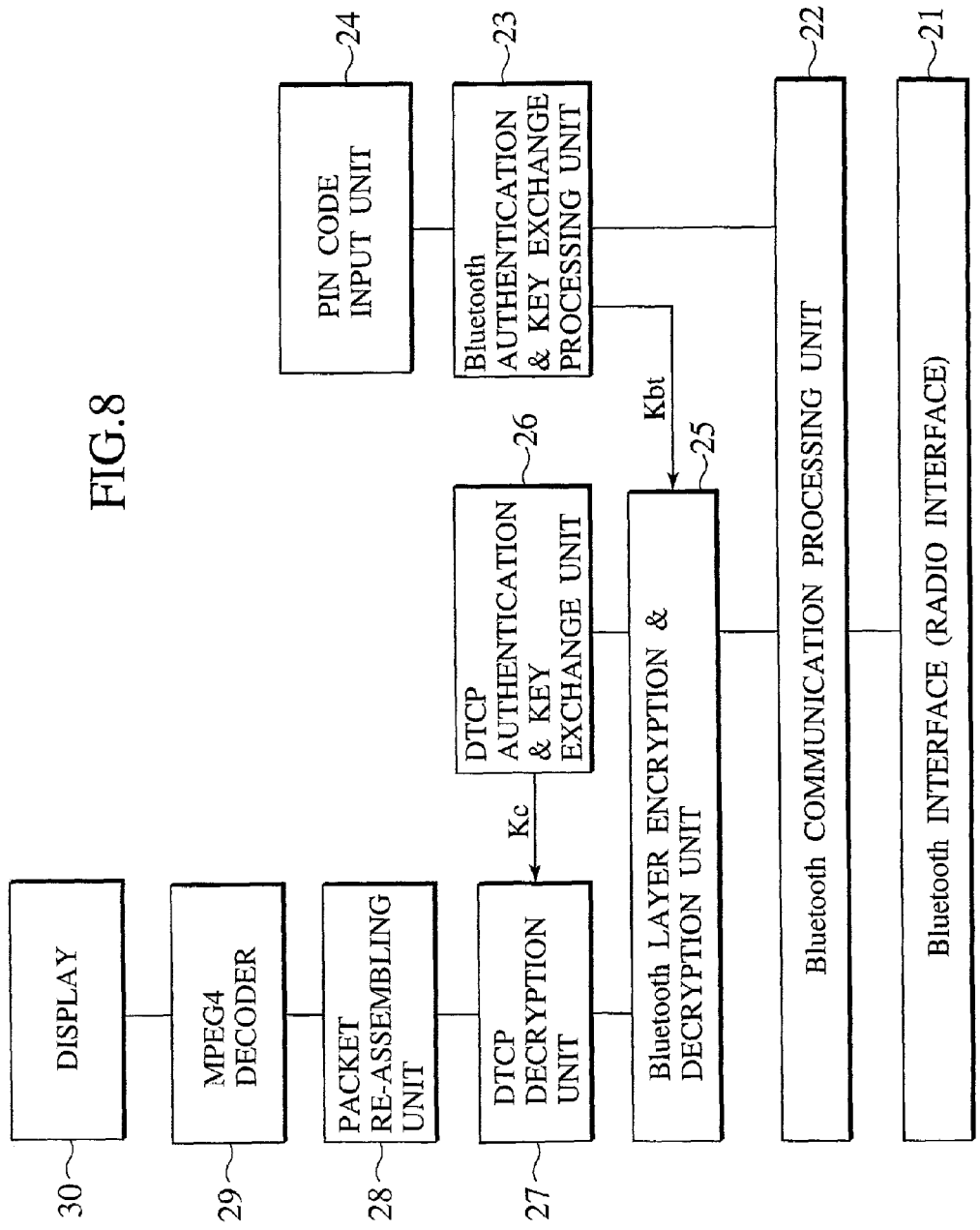
FIG. 8 is a block diagram showing an exemplary internal configuration of a portable viewer in a radio communication system according to the second embodiment of the present invention.
Figure 9:
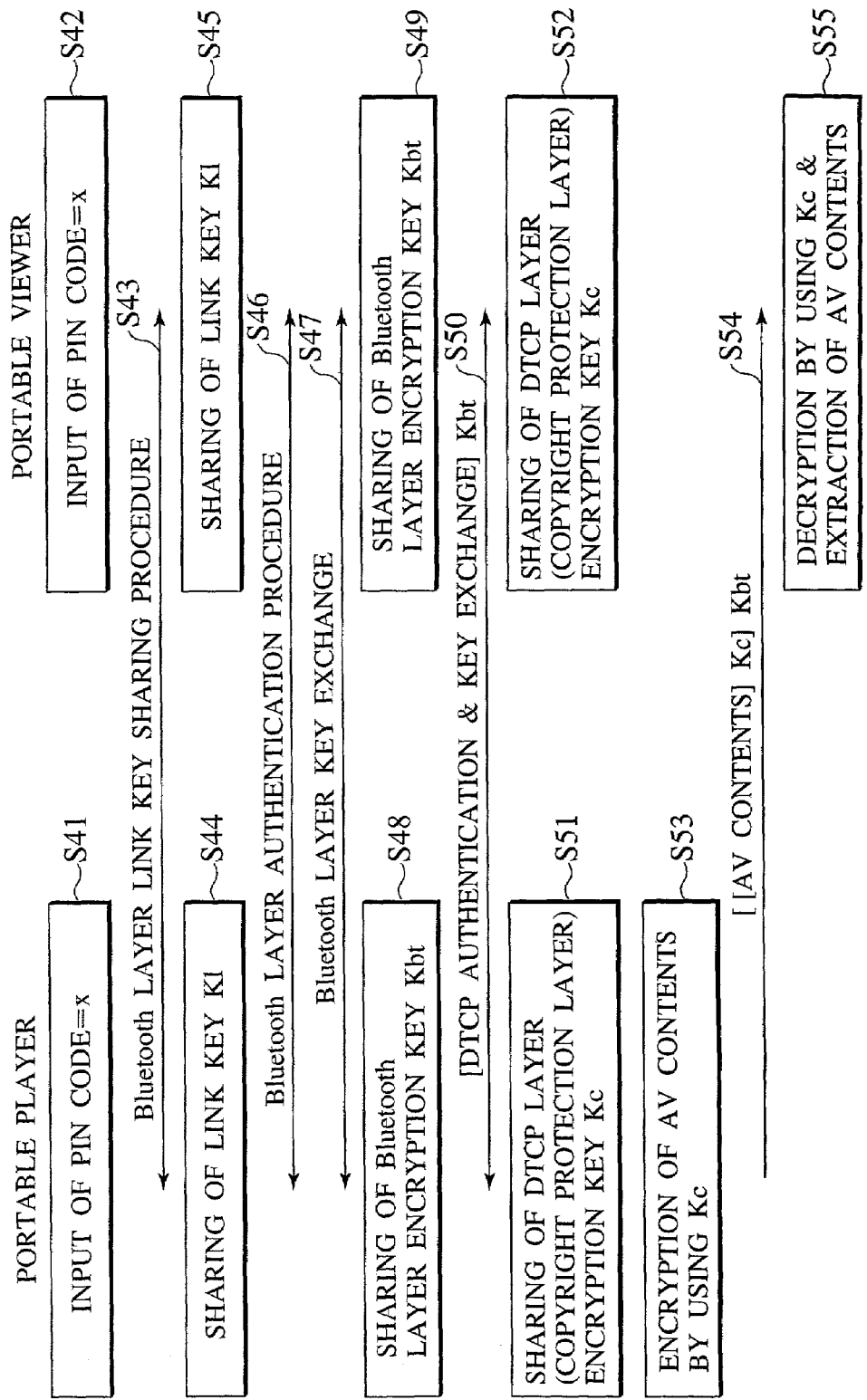
FIG. 9 is a sequence chart showing an exemplary operation sequence between a portable MPEG4 player and a portable viewer which are a legitimate pair in a radio communication system according to the second embodiment of the present invention.

Referring now to FIG. 7 to FIG. 9, the second embodiment of the present invention will be described in detail.

The first embodiment described above is directed to the case where a whole or a part of the copyright protection layer (DTCP) authentication and key exchange procedure is carried out through the Bluetooth layer encryption and decryption units. In contrast, this second embodiment is directed to the case where the transfer of the MPEG4 data (AV data) itself is also carried out through the Bluetooth layer encryption and decryption units. In the following, the differences from the first embodiment will be mainly described.

FIG. 7 shows an exemplary internal configuration of the portable MPEG4 player 101 of this embodiment which corresponds to that of FIG. 2 in the first embodiment. Also, FIG. 8 shows an exemplary internal configuration of the portable viewer 102 (103) of this embodiment which corresponds to that of FIG. 3 in the first embodiment. In either one, a difference is that a Bluetooth layer encryption and decryption unit 15 or 25 is connected between the Bluetooth communication processing unit 12 or 22 and the DTCP encryption unit 17 or 27.

Also, FIG. 9 shows an exemplary sequence in this embodiment which corresponds to that of FIG. 5 in the first embodiment. Note that, in FIG. 9, aspects related to the encryption and decryption at the link layer are omitted as they are obvious.

This sequence differs from that of the first embodiment in that the double encryption using the DTCP layer (copyright protection layer) encryption key Kc and the Bluetooth layer encryption key Kbt is applied to the AV data. Namely, the portable MPEG4 player 101 encrypts the copyright protected AV contents to be transmitted by using the encryption key Kc first, and then encrypts the encrypted AV contents by using the encryption key Kbt (step S54). Also, the portable viewer 102 decrypts the received encrypted AV contents by using the encryption key Kbt first, and then decrypts the decrypted AV contents by using the encryption key Kc (step S54). The other steps S41 to S53 and S55 of FIG. 9 are similar to the steps S11 to S23 and S25 of FIG. 5 described above.

In comparison with the first embodiment, this second embodiment requires a slower processing speed because the Bluetooth encryption is applied to both the DTCP authentication and key exchange as well as the data encryption and decryption, but the device configuration can be made simpler. For example, in the case where the DTCP processing is carried out on a single LSI, all inputs and outputs can be passed through the Bluetooth layer encryption and decryption units so that the configuration can be simplified.

Note that, in this second embodiment, similarly as in the first embodiment, it is highly unlikely to have the same PIN code entered into devices which are not the legitimate pair (which are owned by different persons, for example), so that the Bluetooth layer authentication procedure will fail. As a result, the subsequent Bluetooth layer key exchange procedure will not be carried out. Then, as the Bluetooth encryption cannot be realized, it is impossible to move on to the DTCP authentication and key exchange procedure, and therefore the DTCP authentication and key exchange cannot be completed successfully. Thus, the copyright protected AV data cannot be transferred between devices which are not the legitimate pair (which are owned by different persons, for example).

As described, in the present invention, between a transmitting device and a receiving device, a first authentication and key exchange procedure depending on a radio link layer network is carried out, and then a whole or a part of a second authentication and key exchange procedure depending on the copyright protected contents data is carried out by using the cipher communication using a first encryption key that is shared between the transmitting device and the receiving device by the first authentication and key exchange procedure, so that the contents data transfer by the cipher communication using a second encryption key can be carried out only between legitimate pair of the transmitting device and the receiving device that can successfully complete the first authentication.

Thus, according to the present invention, it is possible to share the encryption key properly only between the legitimate devices which can successfully complete the authentication procedure, so that it becomes possible to realize the data transfer using the cipher communication only between devices which have properly shared the encryption key.

It is to be noted that the above embodiments have been described for the exemplary case of using the Bluetooth as the radio LAN, but there are many other radio LANs which have the security function such as the link layer level authentication and key exchange, encryption, etc., such as 802.11 radio LAN, WECA scheme radio LAN, Home RF scheme radio LAN, etc., and it is also possible to apply the present invention to any of these various other types of the radio LAN.

It is also to be noted that the portable MPEG4 player 101 and the portable viewer 102 used in the above embodiments are just examples of a transmitting device and a receiving device in general, and the display 30 in the portable viewer 102 shown in FIG. 3 or FIG. 8 is just an example of a unit for reproducing the contents data in general and can be replaced by any other suitable type of such a contents data reproduction unit such as audio player in the case of dealing with audio data, for example.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each one of the transmitting device and the receiving device in each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A transmitting device for transmitting copyright protected contents data to a receiving device through radio communications the transmitting device comprising:

a first authentication unit configured to carry out a first authentication with the receiving device, for judging whether the receiving device is a device that is allowed to communicate with the transmitting device or not, on a radio link layer of the radio communications;

a first key exchange unit configured to generate a first encryption key and share the first encryption key with the receiving device when the first authentication with the receiving device by the first authentication unit is successful;

a second authentication unit configured to carry out a second authentication with the receiving device, for protecting copyright of the contents data to be transmitted, through an encrypted radio communication using the first encryption key;

a second key exchange unit configured to generate a second encryption key and share the second encryption key with the receiving device when the second authentication with the receiving device by the second authentication unit is successful; and a communication unit configured to transmit the contents data to the receiving device through an encrypted communication path which is encrypted by using the second encryption key and provided on the radio link layer, wherein at least one of the second authentication unit and the second key exchange unit rejects its process of at least one of authentication and key exchange with the receiving device when at least one of the first authentication by the first authentication unit and the first key exchange by the first key exchange unit with the receiving device is unsuccessful.

2. The transmitting device of claim 1, wherein when the second authentication or sharing of the second encryption key is failure for a reason that the encrypted radio communication on the radio link layer is missing, one of the second authentication unit and the second key exchange unit notifies the failure and the reason to the receiving device.

3. The transmitting device of claim 1, further comprising a storage unit configured to store the contents data.

4. The transmitting device of claim 1, wherein the first authentication by the first authentication unit is success when a PIN code entered at the transmitting device and a PIN code notified from the receiving device are in a prescribed relationship.

5. The transmitting device of claim 4, wherein each PIN code contains at least one of a varying code information, a prescribed code information, a body information acquired from a body of a user, and an attribute information regarding attributes of the user.

6. A transmitting device for transmitting copyright protected contents data to a receiving device through radio communications, the transmitting device comprising:

a first authentication unit configured to carry out a first authentication with the receiving device, for judging whether the receiving device is a device that is allowed to communicate with the transmitting device or not, on a radio link layer of the radio communications;

a first key exchange unit configured to generate a first encryption key and share the first encryption key with the receiving device when the first authentication with the receiving device by the first authentication unit is successful;

a second authentication unit configured to carry out a second authentication with the receiving device, for protecting copyright of the contents data to be transmitted, through an encrypted radio communication using the first encryption key;

a second key exchange unit configured to generate a second encryption key and share the second encryption key with the receiving device when the second authentication with the receiving device by the second authentication unit is successful; and a communication unit configured to set up an encrypted communication path which is encrypted by using the second encryption key on the encrypted radio communication which is encrypted by using the first encryption key, and transmit the contents data to the receiving device through the encrypted communication path, wherein at least one of the second authentication unit and the second key exchange unit rejects its process of at least one of authentication and key exchange with the receiving device when at least one of the first authentication by the first authentication unit and the first key exchange by the first key exchange unit with the receiving device is unsuccessful.

7. The transmitting device of claim 6, wherein when the second authentication or sharing of the second encryption key is failure for a reason that the encrypted radio communication on the radio link layer is missing, one of the second authentication unit and the second key exchange unit notifies the failure and the reason to the receiving device.

8. The transmitting device of claim 6, further comprising a storage unit configured to store the contents data.

9. The transmitting device of claim 6, wherein the first authentication by the first authentication unit is success when a PIN code entered at the transmitting device and a PIN code notified from the receiving device are in a prescribed relationship.

10. The transmitting device of claim 9, wherein each PIN code contains at least one of a varying code information, a prescribed code information, a body information acquired from a body of a user, and an attribute information regarding attributes of the user.

11. A receiving device for receiving copyright protected contents data transmitted from a transmitting device through radio communications, the receiving device comprising:

a first authentication unit configured to carry out a first authentication with the transmitting device, for enabling the receiving device to operate as a device that is allowed to communicate with the transmitting device, on a radio link layer of the radio communications;

a first key exchange unit configured to generate a first encryption key and share the first encryption key with the transmitting device when the first authentication with the transmitting device by the first authentication unit is successful;

a second authentication unit configure to carry out a second authentication with the transmitting device, for protecting copyright of the contents data to be transmitted, through an encrypted radio communication using the first encryption key;

a second key exchange unit configured to generate a second encryption key and share the second encryption key with the transmitting device when the second authentication with the transmitting device by the second authentication unit is successful; and a communication unit configured to receive the contents data transmitted from the transmitting device through an encrypted communication path which is encrypted by using the second encryption key and provided on the radio link layer, wherein at least one of the second authentication unit and the second key exchange unit rejects its process of at least one of authentication and key exchange with the transmitting device when at least one of the first authentication by the first authentication unit and the first key exchange by the first key exchange unit with the transmitting device is unsuccessful.

12. The receiving device of claim 11, further comprising a reproduction unit configured to reproduce the contents data.

13. The receiving device of claim 11, wherein the first authentication by the first authentication unit is success when a PIN code entered at the receiving device and a PIN code notified from the transmitting device are in a prescribed relationship.

14. The receiving device of claim 13, wherein each PIN code contains at least one of a varying code information, a prescribed code information, a body information acquired from a body of a user, and an attribute information regarding attributes of the user.

15. A receiving device for receiving copyright protected contents data transmitted from a transmitting device through radio communications, the receiving device comprising:
 a first authentication unit configured to carry out a first authentication with the transmitting device, for enabling the receiving device to operate as a device that is allowed to communicate with the transmitting device, on a radio link layer of the radio communications;
 a first key exchange unit configured to generate a first encryption key and share the first encryption key with the transmitting device when the first authentication with the transmitting device by the first authentication unit is successful;
 a second authentication unit configured to carry out a second authentication with the transmitting device, for protecting copyright of the contents data to be transmitted, through an encrypted radio communication using the first encryption key;
 a second key exchange unit configured to generate a second encryption key and share the second encryption key with the transmitting device when the second authentication with the transmitting device by the second authentication unit is successful; and
 a communication unit configured to set up an encrypted communication path which is encrypted by using the second encryption key on the encrypted radio communication which is encrypted by using the first encryption key, and receive the contents data transmitted from the transmitting device through the encrypted communication path,
 wherein at least one of the second authentication unit and the second key exchange unit rejects its process of at least one of authentication and key exchange with the transmitting device when at least one of the first authentication by the first authentication unit and the first key exchange by the first key exchange unit with the transmitting device is unsuccessful.

16. The receiving device of claim 15, further comprising a reproduction unit configured to reproduce the contents data.

17. The receiving device of claim 15, wherein the first authentication by the first authentication unit is success when a PIN code entered at the receiving device and a PIN code notified from the transmitting device are in a prescribed relationship.

18. The receiving device of claim 17, wherein each PIN code contains at least one of a varying code information, a prescribed code information, a body information acquired from a body of a user, and an attribute information regarding attributes of the user.

19. A radio communication system, comprising a transmitting device for transmitting copyright protected contents data through radio communications, and a receiving device for receiving the contents data transmitted from the transmitting device, each one of the transmitting device and the receiving device having:
 a first authentication unit configured to carry out a first authentication between the transmitting device and the receiving device, for judging whether the transmitting device and the receiving device are devices that are allowed to communicate with the transmitting device or not, on a radio link layer of the radio communications;
 a first key exchange unit configured to generate a first encryption key and share the first encryption key between the transmitting device and the receiving device when the first authentication between the transmitting device and the receiving device by the first authentication unit is successful;
 a second authentication unit configured to carry out a second authentication between the transmitting device and the receiving device, for protecting copyright of the contents data to be transmitted, through an encrypted radio communication using the first encryption key;
 a second key exchange unit configured to generate a second encryption key and share the second encryption key between the transmitting device and the receiving device when the second authentication between the transmitting device and the receiving device by the second authentication unit is successful; and
 a communication unit configured to transfer the contents data from the transmitting device to the receiving device through an encrypted communication path which is encrypted by using the second encryption key and provided on the radio link layer;
 wherein at least one of the second authentication unit and the second key exchange unit rejects its process of at least one of authentication and key exchange with one of the transmitting device and the receiving device when at least one of the first authentication by the first authentication unit and the first key exchange by the first key exchange unit with one of the transmitting device and the receiving device is unsuccessful.

20. A radio communication system, comprising a transmitting device for transmitting copyright protected contents data through radio communications, and a receiving device for receiving the contents data transmitted from the transmitting device, each one of the transmitting device and the receiving device having:
 a first authentication unit configured to carry out a first authentication between the transmitting device and the receiving device, for judging whether the transmitting device and the receiving device are devices that are allowed to communicate with the transmitting device or not, on a radio link layer of the radio communications;
 a first key exchange unit configured to generate a first encryption key and share the first encryption key between the transmitting device and the receiving device when the first authentication between the transmitting device and the receiving device by the first authentication unit is successful;
 a second authentication unit configured to carry out a second authentication between the transmitting device and the receiving device, for protecting copyright of the contents data to be transmitted, through an encrypted radio communication using the first encryption key;
 a second key exchange unit configured to generate a second encryption key and share the second encryption key between the transmitting device and the receiving device when the second authentication between the transmitting device and the receiving device by the second authentication unit is successful; and a communication unit configured to set up an encrypted communication path which is encrypted by using the second encryption key on the encrypted radio communication which is encrypted by using the first encryption key, and transfer the contents data from the transmitting device to the receiving device through the encrypted communication path, wherein at least one of the second authentication unit and the second key exchange unit rejects its process of at least one of authentication and key exchange with one of the transmitting device and the receiving device when at least one of the first authentication by the first authentication unit and the first key exchange by the first key exchange unit with one of the transmitting device and the receiving device is unsuccessful.

21. A contents data transfer method in a radio communication system comprising a transmitting device for transmitting copyright protected contents data through radio communications and a receiving device for receiving the contents data transmitted from the transmitting device, the contents data transfer method comprising:

carrying out a first authentication between the transmitting device and the receiving device, for judging whether the transmitting device and the receiving device are devices that are allowed to communicate with the transmitting device or not, on a radio link layer of the radio communications;

generating a first encryption key and sharing the first encryption key between the transmitting device and the receiving device when the first authentication between the transmitting device and the receiving device is successful;

carrying out a second authentication between the transmitting device and the receiving device, for protecting copyright of the contents data to be transmitted, through an encrypted radio communication using the first encryption key;

generating a second encryption key and sharing the second encryption key between the transmitting device and the receiving device when the second authentication between the transmitting device and the receiving device is successful;

rejecting a process of at least one of authentication and key exchange with one of the transmitting device and the receiving device when at least one of the first authentication and the first key exchange with one of the transmitting device and the receiving device is unsuccessful, and transferring the contents data from the transmitting device to the receiving device through an encrypted communication path which is encrypted by using the second encryption key and provided on the radio link layer.

22. A contents data transfer method in a radio communication system comprising a transmitting device for transmitting copyright protected contents data through radio communications and a receiving device for receiving the contents data transmitted from the transmitting device, the contents data transfer method comprising:

carrying out a first authentication between the transmitting device and the receiving device, for judging whether the transmitting device and the receiving device are devices that are allowed to communicate with the transmitting device or not, on a radio link layer of the radio communications;

generating a first encryption key and sharing the first encryption key between the transmitting device and the receiving device when the first authentication between the transmitting device and the receiving device is successful;

carrying out a second authentication between the transmitting device and the receiving device, for protecting copyright of the contents data to be transmitted, through an encrypted radio communication using the first encryption key;

generating a second encryption key and sharing the second encryption key between the transmitting device and the receiving device when the second authentication between the transmitting device and the receiving device is successful;

rejecting a process of at least one of authentication and key exchange with one of the transmitting device and the receiving device when at least one of the first authentication and the first key exchange unit one of the transmitting device and with the receiving device is unsuccessful; and setting up an encrypted communication path which is encrypted by using the second encryption key on the encrypted radio communication which is encrypted by using the first encryption key, and transferring the contents data from the transmitting device to the receiving device through the encrypted communication path.

23. A transmitting device for transmitting copyright protected contents data to a receiving device through radio communications, the transmitting device comprising:

a first key exchange unit configured to generate a first encryption key and share the first encryption key with the receiving device;

an authentication unit configured to carry out an authentication with the receiving device, for protecting copyright of the contents data to be transmitted, through an encrypted radio communication using the first encryption key;

a second key exchange unit configured to generate a second encryption key and share the second encryption key with the receiving device when the authentication with the receiving device by the authentication unit is successful, wherein an encrypted communication path which is encrypted by using the second encryption key is set up on the encrypted radio communication which is encrypted by using the first encryption key, and the contents data are transmitted to the receiving device through the encrypted communication path, and wherein the second key exchange unit rejects its process of key exchange with the receiving device when at least one of the authentication by the authentication unit and the first key exchange by the first key exchange unit with the receiving device is unsuccessful.

24. A receiving device for receiving copyright protected contents data transmitted from a transmitting device through radio communications, the receiving device comprising:

a first key exchange unit configured to generate a first encryption key and share the first encryption key with the transmitting device;

an authentication unit configured to carry out an authentication with the transmitting device, for protecting copyright of the contents data to be received, through an encrypted radio communication using the first encryption key; and a second key exchange unit configured to generate a second encryption key and share the second encryption key with the transmission device when the authentication with the transmitting device by the authentication unit is successful, wherein an encrypted communication path which is encrypted by using the second encryption key is set up on the encrypted radio communication which is encrypted by using the first encryption key, the contents data transmitted from the transmitting device are received through the encrypted communication path, and wherein the second key exchange unit rejects its process of key exchange with the transmitting device when at least one of the authentication by the authentication unit and the first key exchange by the first key exchange unit with the transmitting device is unsuccessful.

* * * * *